Figure 1:
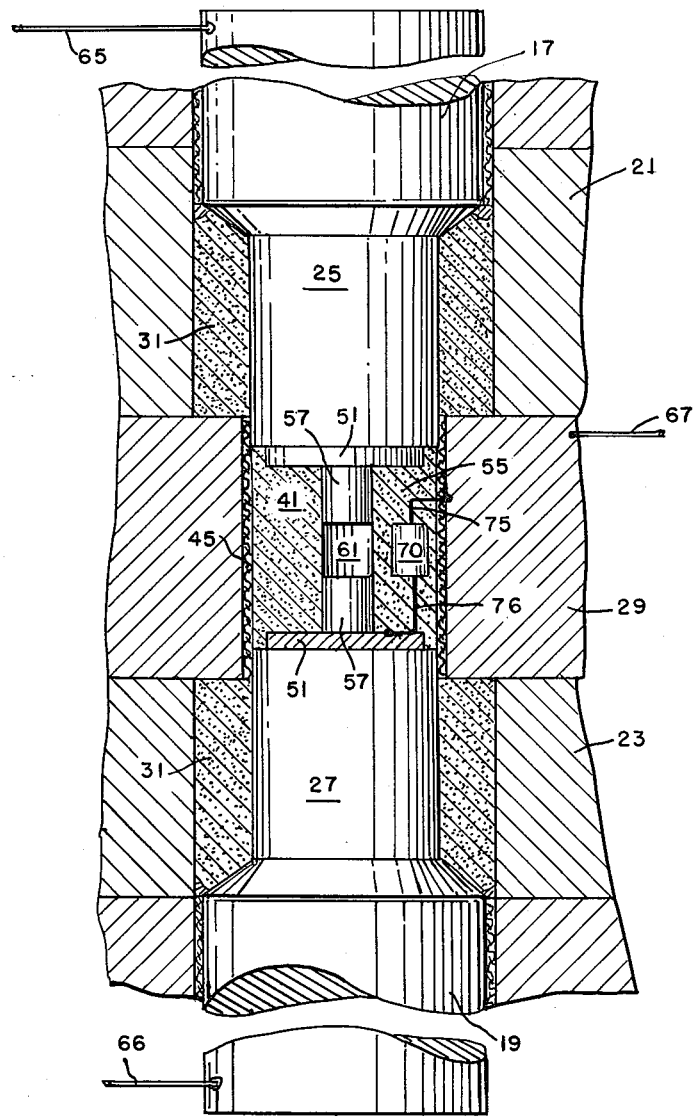

INVENTORS,
ARMANDO A. GIARDINI
JOHN E. TYDINGS
BY Jack H. Linscott
ATTORNEY.

3,067,465
PRESSURE AND TEMPERATURE SENSING DEVICE FOR HIGH PRESSURE APPARATUS
Armando A. Giardini, Eatontown, and John E. Tydings, Red Bank, N.J., assignors to the United States of America as represented by the Secretary of the Army
Filed Apr. 5, 1961, Ser. No. 101,034
7 Claims. (Cl. 18—16.5)
(Granted under Title 35, U.S. Code (1952), sec. 266)

The invention described herein may be manufactured and used by or for the Government for governmental purposes without the payment of any royalty thereon.

This invention relates to the measurement of very high pressures and elevated temperatures in high pressure apparatus in which materials are pressed under pressures in the order of 600,000 pounds per square inch at either normal or elevated temperatures.

Pressure gauges are usually classified into primary gauges in which absolute pressure is found from the structure of the instrument itself and secondary gauges the readings of which are interpreted into absolute pressure by proper calibration. For measuring pressures in the neighborhood above 50,000 pounds per square inch only secondary gauges are usually usable. The simplest known effect on which to base a secondary gauge is the change of electrical resistance of a metal wire. Such gauges have, however, the disadvantage of the necessity for separate metallurgical "seasoning" and calibration before each experiment. They also show the disadvantage in that extrapolation for higher pressures is not a linear function of the measurements at lower pressures. Besides, a necessary prerequisite for a satisfactory measurement with metal wires is that the metal must be easily obtained in a state of very high purity and consistent metallurgical history (structure, grain size), imperfections, etc.

We now have found that solid state electrochemical cells or batteries (also called solid electrolyte cells or batteries) may be used to great advantage as pressure and temperature sensing devices even at very high pressures such as those in the neighborhood of 600,000 p.s.i. at both normal or elevated temperatures.

The solid state cells or batteries to be used according to the present invention generally consist of a metallic electron donor anode, and an electron acceptor cathode comprising an oxide of a polyvalent metal in a higher valent state, these electrodes being separated by a solid, ionically but not electronically conductive electrolyte such as silver halides, alkali halides, etc. Such solid state cells or batteries are, for instance, described in U.S. Patent Nos. 2,894,052 and 2,894,053. To reduce anode polarization in such solid state batteries, it is of great advantage to amalgamate the silver anode as described in U.S. patent application Serial No. 84,737 filed Jan. 24, 1961, by John N. Mrgudich and assigned to the United States Government.

Since such solid state cells or batteries are made entirely of solids, with no liquids or gases evolving as a result of the electrochemical activity of the cell when in operation, they are amenable to miniaturization to suitable limits so that they can easily be inserted directly into small volume high pressure reaction vessels. The cells can be readily packaged in sealed metallic or other suitable casings and frequently recovered intact from pressure vessels and used again. Cells can be assembled either in series or parallel or both, electrically, to give a variety of output voltages or currents. Cells constructed of different combinations of materials can be assembled to give a variety of pressure (and temperature) output characteristics. Since the cells give no volatile or liquid reaction products and can be encased in materials inert to other substances which may be present in the high pressure vessel, no undesirable contamination would result. Since output intensity of the cell or battery can be readily controlled by design, only a simple direct current voltmeter or ammeter of suitable range or suitable combinations of both are required to determine pressures (or temperatures) within the high pressure vesels, which results in a much more simplified, self-powered, direct and inexpensive method.

The invention will be described in detail with the help of the accompanying drawing showing in FIG. 1 in elevational cross-section parts of the high pressure and high temperature apparatus as described in our copending patent application Serial No. 19,125, Armando A. Giardini and John E. Tydings, filed March 31, 1960; FIG. 2 shows an oblique cross-section of the solid electrolyte cell used in the apparatus of FIG. 1.

Figure 2:
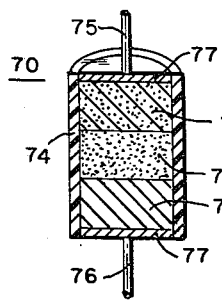

The apparatus of FIG. 1 shows two opposing tungsten carbide pistons 17 and 19, the ends of which terminate in tapered portions. The pistons 17, 19 ride in tungsten carbide cylinders 21, 23. A pair of opposing spaced tungsten carbide pistons 25, 27 each of a diameter smaller than that of the pistons 17, 19 are in operable engagement with the pistons 17, 19. These pistons 25, 27 ride in a carbide cylinder 29 which is located intermediate, and in abutment with the lower and upper faces of the cylinders 21, 23, respectively. This arrangement of pistons and cylinders defines two support areas 31, the bounds of each area being: the tapered ends of the pistons 17, 19; the inner peripheral walls of the cylinders 21, 23; and portions of the top and bottom surfaces of the cylinder 29. These two support areas 31 contain a compressible pressure transmitting material, e.g., pyrophyllite. The main pressure area 41 is defined by the inner peripheral wall of cylinder 29 and the exposed faces of the pistons 25, 27.

Two electric metal contacts, e.g., nickel or gold plates 51, serve to provide optimum electric contact between the high pressure pistons 27, 25 and two sealing plugs 57 respectively. These two plugs 57 hold the material to be pressed in the pressure chamber or pressure vessel 61 which serves as the receptacle for the sample or material to be worked upon. The pressure chamber 61 is formed of the tubular shaped mass 55 which is made of a pressure transmitting electrically insulating medium, preferably pyrophyllite. As mechanical forces are applied, the various piston assemblies converge along their axis. A portion of the force applied to the larger pistons 17, 19 is transmitted directly to the pistons 25, 27 which in turn generate the very high pressure in the specimen area 41. The remaining effective force applied to the pistons 17 and 19 is expended upon the solid compressible support material in the support areas 31. As this material is compressed, it transmits pressure both on the exposed peripheral surfaces of the pistons 25, 27 and on both the top and bottom exposed faces of cylinder 29. These pressures are transmitted to the pressure transmitting mass 55 and the two metal plugs 57, thus compressing the sample to be worked upon in the chamber 61. Instead of pyrophyllite other aggregates such as soap stone, lithograph lime stone, hot-pressed boron nitride and other substances mentioned in the above-cited application may be used.

To heat the material within the high pressure area electric current is introduced thru terminals 65 to piston 17 and thru the high pressure piston 25, upper metal plate 51, upper plug 57 and the working sample to the lower plug 57, the lower metal plate 51, the high pressure piston 27 and piston 19 to the other terminal 66. A sleeve 45 of electrically insulating material, e.g., paper or nylon surrounds the pressure transmitting mass 55 and thus prevents the electric current from flowing thru any of the other metal parts of the assembly.

According to the invention a solid state electrochemical cell 70 or battery is inserted within the main pressure area 41. Preferably, as shown in the drawing, the solid electrolyte cell 70 is inserted in the pressure transmitting mass 55. The cell 70 is set as far as possible from the center of the chamber 61 to prevent overheating of the cell 70 in case the sample is heated at higher temperatures. The cell 70 consists, as shown in FIG. 2, of an electron donor anode 71, a solid electrolyte 72 and an electron acceptor cathode 73. The anode 71 consists, for instance, of silver, mercury-silver amalgam, bismuth, thallium, tellurium, cesium, barium, etc. The ionically conducting solid electrolyte 72 consisting, for instance, of silver iodide, silver chloride, bismuth chloride, bismuth iodide, thallium chromate, tellurium chloride, cesium chloride, rubidium chloride and barium chloride. The electron acceptor cathode 73 consists, for instance, of manganese dioxide, potassium dichromate, mercury oxide and other suitable oxidizing agents. The cell assembly is inclosed within a sleeve 74 of insulating material as, for instance, nylon. An anode terminal 75 is connected by means of a nickel plate 77 to the anode 71 and leads thru the sleeve 45 to the cylinder 29. The cathode terminal 76 leads by means of another nickel plate 77 from the cathode 73 to the lower metal plate 51 making contact with the piston 27. Thus by connecting a suitable voltmeter between the terminals 66 and 67 electrical changes in the solid state cell or battery may be easily measured. These solid electrolyte cells are found to be both pressure-sensitive and temperature-sensitive in their electrical output characteristics. They may be exposed within the pressure apparatus to about 200 to 300° C. provided the output of the cell is corrected for these temperatures. It is advisable not to take the readings for pressure sensitivity from the cell while the temperature is elevated but to wait until the temperature goes down to room temperature.

As the pressure is raised the ionic conductivity of the solid electrolyte is depressed and therefore the higher the pressure the lower the voltage of the cell. As the temperature is raised the ionic conductivity of the solid electrolyte is increased. The rate of these changes is relatively high, and significant changes may be observed in relation to the very high pressures. The solid electrolyte cells remain very sensitive even at very high pressures. In general, it may be said that within a range of 600,000 p.s.i. the output characteristics of the cell may decrease by a factor of 2,000, that is, for instance, from 2 volts to 0.001 volt. The geometry of the cell is optional as long as the proper components are arranged in the right sequence to provide the required electronic-ionic circuitry.

It will be obvious to those skilled in the art of solid electrolyte cells and batteries that a great number of variations and combinations are possible. The solid electrolyte cell or battery may be inserted in any suitable part of the main pressure area of any high pressure apparatus. It will be understood that various other constructions of the cell or battery in all kinds of pressure apparatus may be used thru a wide range without departing from the principle of this invention as defined in the appended claims.

What is claimed is:
1. Secondary pressure and temperature gauges for an apparatus for generating high pressures in the order of 600,000 p.s.i. said apparatus comprising pairs of opposing multi-stepped pistons, said pistons converging towards a main pressure area, said main pressure area containing a tubularly-shaped mass of pressure transmitting material, said tubularly-shaped pressure transmitting material forming the high pressure chamber which serves as the receptacle for the sample to be exposed to said very high pressures, means for heating said sample under pressure in said high pressure vessel, characterized in that at least one solid electrolyte cell is provided within the high pressure area said cell being electrically connected to an instrument for measuring changes in the electrical characteristics of the cell with changes in pressure and temperature.

2. Secondary pressure and temperature gauges according to claim 1 in which said solid electrolyte cell is located within said pressure transmitting material contained in the high pressure chamber.

3. Secondary pressure and temperature gauges according to claim 2 in which said solid electrolyte cell is located near as possible to the outer wall of said tubularly-shaped mass of pressure transmitting material provided in said high pressure chamber.

4. Secondary pressure and temperature gauges according to claim 1 in which said solid electrolyte cell comprises a silver anode, a manganese dioxide cathode and solid silver iodide as the electrolyte.

5. Secondary pressure and temperature gauges according to claim 1 in which the solid electrolyte cell comprises a mercury-silver amalgam anode, a mercury oxide cathode and a silver iodide electrolyte.

6. Secondary pressure and temperature gauges according to claim 1 in which the solid electrolyte cell consists of cylindrical cell elements inclosed in a cylinder of thin dielectric material, said cylinder being closed by metal plates serving as the terminals for the cell.

7. Secondary pressure and temperature gauges according to claim 6 in which said cylindrical cell elements are inclosed in a thin nylon cylinder, said cylinder being closed by thin nickel plates serving as the terminals for the cell.

References Cited in the file of this patent
UNITED STATES PATENTS

| | | |
|---|---|---|
| 2,745,278 | Roberts et al. | May 15, 1956 |
| 2,871,698 | Bagby | Feb. 3, 1959 |
| 2,910,868 | Fisher | Mar. 3, 1959 |
| 2,896,095 | Reed et al. | July 21, 1959 |
| 2,941,248 | Hall | June 21, 1960 |
| 2,941,251 | Strong | June 21, 1960 |

OTHER REFERENCES

"Some High-Pressure, High-Temperature Apparatus Design Consideration: Equipment for use at 100,000 Atmospheres and 3000° C."—H. T. Hall, Review of Scientific Instruments, vol. 20, No. 4, April 1958, pages 267–272.

"The Resistance of 72 Elements, Alloys and Compounds to 100,000 K9/cm.$^2$"—P. W. Bridgeman, American Academy of Arts and Sciences, vol. 81, No. 2 (1952), pages 169–183.